D. FLANERY.
Telegraph Apparatus.
No. 95,013. Patented Sept. 21, 1869.
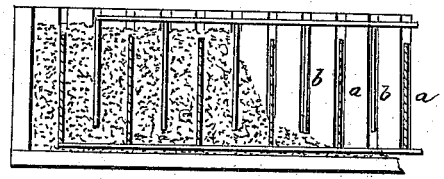
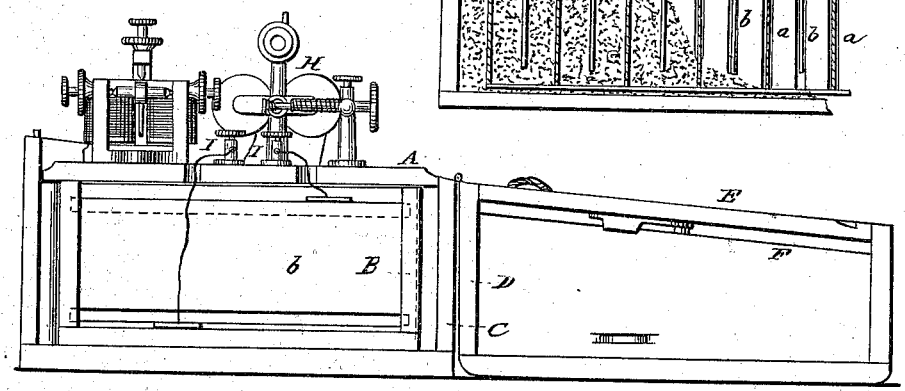
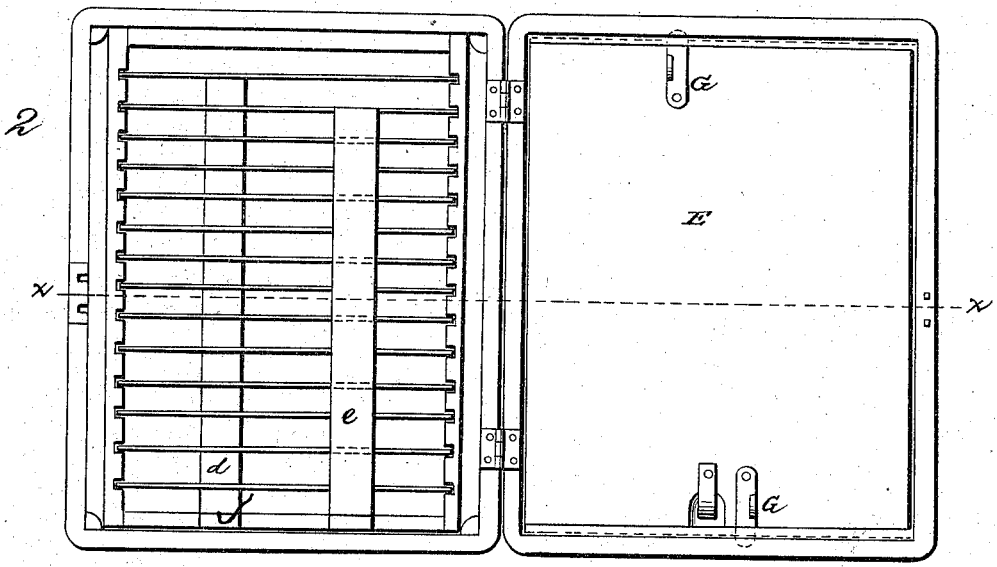
Witnesses
Wm. F. Clark.
Frank B. Clay
Inventor
D. Flanery
PER Munn & Co
Attorneys

United States Patent Office.

DAVID FLANERY, OF NEW ORLEANS, LOUISIANA.

Letters Patent No. 95,013, dated September 21, 1869.

IMPROVEMENT IN TELEGRAPH-APPARATUS.

The Schedule referred to in these Letters Patent and making part of the same.

*To all whom it may concern:*

Be it known that I, DAVID FLANERY, of New Orleans, in the parish of Orleans, and State of Louisiana, have invented a new and improved Telegraph-Apparatus; and I do hereby declare that the following is a full, clear, and exact description thereof, which will enable others skilled in the art to make and use the same, reference being had to the accompanying drawings, forming part of this specification.

The object of this invention is to provide a portable telegraph-apparatus, comprising a "relay," "magnet," "key," "sounder," "local galvanic battery," and writing-desk, all contained in a portable box, such as may be slung upon the shoulder by a strap, to be carried from place to place by the operator; also, to provide an improved local battery, specially adapted for a portable apparatus.

Figure 1 represents a sectional elevation of my improved apparatus, taken on the line *x x* of fig. 2, the case being open;

Figure 2 represents a plan view of the same; and

Figure 3 represents a transverse section of the battery, taken at right angles to the line *x x*.

Similar letters of reference indicate corresponding parts.

The relay, key, and sounder, which are all well-known instruments needing no special description, are placed, in any preferred order of arrangement, on the detachable plate A, covering the trough B of the local battery, in the part C of a box or case, made in two parts, C and D, hinged together, and arranged to open in the form of common portable writing-desks.

The plate or top E, of the front part D of the case, is made to rest loosely above the cleats F, when the case is opened and in use, so as to be readily lifted off its seat and placed at the bottom of the case, when it is to be closed over the instruments. It is provided with buttons, G, for securing it at the bottom by turning the ends of the said buttons into recesses in the sides of the case.

The local battery is formed in a trough, and consists of alternate plates of zinc, *a*, and copper, *b*, held vertically edgewise in their places, in grooves in the sides of the trough, at proper distances apart.

The zinc plates rest on or are attached to a longitudinal bar, *d*, of zinc, resting on the bottom of the trough, and the copper plates are attached to a longitudinal bar of copper, *e*, at the top.

The zinc plates do not reach as high as the upper copper bar, nor do the copper plates reach as low as the inferior zinc bar. They are then not a series of pairs of plates, but a pair of laminated plates, exposing a large surface to the exciting liquid.

When the plates are in position as above, the trough is filled with sand, which is moistened with a solution of sal-ammoniac.

Upon connecting the poles of the battery with the sounder, a current of electricity flows sufficient to work that instrument several consecutive days, and, by the occasional addition of a little solution, for several consecutive weeks steadily.

Sawdust, moistened with chloride of aluminum, can also be used.

Upon opening the box, and turning it around, the lid or top E will, on being raised from the bottom and placed on the cleats F, be placed next the operator, with the instrument opposite serving as a desk.

The connections are the same as in all Morse instruments, and are plainly shown in the drawing.

The line or main wires are connected by the bending screws or screw-caps behind the relay H and the local battery, as shown, with those on the left at I.

A registering instrument, either to indent paper by a stylus, or to mark paper chemically, as in Barnes' apparatus, could be substituted for the sounder.

Having thus described my invention,

I claim as new, and desire to secure by Letters Patent—

The combination, in a portable box or case, C D, of a local battery, relay, magnet, key, and sounder, when arranged for enclosing the same, and to form a writing-case when open, substantially as specified.

DAVID FLANERY.

Witnesses:
ROBT. PARSONS,
L. A. EVEN.